United States Patent [19]

Bailey et al.

[11] Patent Number: 5,262,379
[45] Date of Patent: Nov. 16, 1993

[54] COLOR FILTER ARRAY ELEMENT WITH POLYIMIDE RECEIVING LAYER

[75] Inventors: David B. Bailey, Webster; Scott E. Tunney, Ontario, both of N.Y.

[73] Assignee: Eastman Kodak Company, Rochester, N.Y.

[21] Appl. No.: 34,033

[22] Filed: Mar. 22, 1993

[51] Int. Cl.$^5$ .................. B41M 5/035; B41M 5/38
[52] U.S. Cl. .................... 503/227; 428/195; 428/210; 428/473.5; 428/913; 428/914; 430/7; 430/201; 430/517; 430/945; 430/964; 359/885
[58] Field of Search ................ 8/471; 350/311; 428/195, 210, 473.5, 913, 914; 430/7, 201, 517, 945, 964; 503/227

[56] References Cited

U.S. PATENT DOCUMENTS 4,962,081 10/1990 Harrison et al. .................. 503/227
4,991,936 2/1991 Simons ............................ 350/317

*Primary Examiner*—B. Hamilton Hess
*Attorney, Agent, or Firm*—Harold E. Cole

[57] ABSTRACT

This invention relates to a thermally-transferred color filter array element comprising a transparent support having thereon a thermally-transferred image comprising a repeating mosaic pattern of colorants in a polyimide binder having a Tg greater than about 200° C.

20 Claims, No Drawings

COLOR FILTER ARRAY ELEMENT WITH POLYIMIDE RECEIVING LAYER

This invention relates to a polyimide receiving layer for a thermally-transferred color filter array element which is used in various applications such as a liquid crystal display device.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta or yellow signal. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

Liquid crystal display devices are known for digital display in electronic calculators, clocks, household appliances, audio equipment, etc. Liquid crystal displays are being developed to replace cathode ray tube technology for display terminals. Liquid crystal displays occupy a smaller volume than cathode ray tube devices with the same screen area. In addition, liquid crystal display devices usually have lower power requirements than corresponding cathode ray tube devices.

There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, the color array elements for liquid crystal display devices so far proposed have not been totally successful in meeting all the users' needs.

One commercially-available type of color filter array element which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Misalignment or improper deposition of color materials may occur during any of these operations. This method therefore contains many labor-intensive steps, requires careful alignment, is time-consuming and very costly. Further details of this process are disclosed in U.S. Pat. No. 4,081,277. U.S. Pat. No. 4,786,148 also discloses a color filter array element which employs certain pigments.

Color liquid crystal display devices generally include two spaced glass panels which define a sealed cavity which is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element or pixel. If the device is to have color capability, a color filter array with, e.g., red, green and blue color areas must be aligned with each pixel. Depending upon the image to be displayed, one or more of the pixel electrodes is energized during display operation to allow full light, no light or partial light to be transmitted through the color filter areas associated with that pixel. The image perceived by a user is a blending of colors formed by the transmission of light through adjacent color filter areas.

In forming such a liquid crystal display device, the color filter array element to be used therein may have to undergo rather severe heating and treatment steps during manufacture. For example, a transparent conducting layer, such as indium tin oxide (ITO), is usually vacuum sputtered onto the color filter array element which is then cured and patterned by etching. The curing may take place at temperatures elevated as high as 200° C. for times which may be as long as one hour or more. This is followed by coating with a thin polymeric alignment layer for the liquid crystals, such as a polyimide, followed by another curing step for up to several hours at an elevated temperature. These treatment steps can be very harmful to many color filter array elements, especially those with a gelatin matrix.

In U.S. Pat. No. 4,962,081, color filter array elements obtained by thermal dye transfer are described. Polycarbonates having a glass transition temperature (Tg) of greater than about 200° C. are described therein for use as the binder for the image-receiving layer. The use of these high Tg polycarbonates helps overcome a problem present with other polymer binders where the transferred image tends to diffuse laterally in the binder causing image smear, especially upon incubation at elevated temperatures. Polycarbonates, however, are generally made in solution from hazardous chemicals (e.g., phosgene and chloroformates). The recovery and disposal of solvents coupled with the dangers of handling phosgene make the preparation of specialty polycarbonates a high cost operation.

It would be desirable to provide a color filter array element having high quality and good sharpness, and to provide such a color filter array element having a binder other than a polycarbonate while still having low lateral image displacement or image smear.

These and other objects are achieved in accordance with this invention which comprises a thermally-transferred color filter array element comprising a transparent support having thereon a thermally-transferred image comprising a repeating mosaic pattern of colorants in a polyimide binder having a Tg greater than about 200° C.

A process of forming a color filter array element according to the invention comprises a) imagewise-heating a dye-donor element comprising a support having thereon a dye layer, and b) transferring portions of the dye layer to a dye-receiving element comprising a support having thereon a dye image-receiving layer, the imagewise-heating being done in such a way as to produce a repeating mosaic pattern of colorants forming a color filter array, wherein the dye image-receiving layer comprises a polyimide binder having a Tg greater than about 200° C.

Polyimides useful in the present invention contain recurring units having the following structural formula:

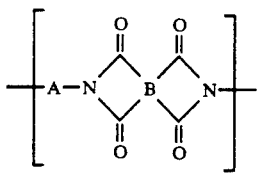

wherein A is derived from a diamine and B is a derived from a dianhydride.

In a preferred embodiment of the invention, the diamine and dianhydride are each aromatic. In another preferred embodiment, both the aromatic diamine and aromatic dianhydride contain fluoro groups.

The above-described polyimides useful in the practice of this invention are known and/or can be prepared by techniques well known to those skilled in the art. For example, the polyimides can be prepared by reacting a diamine with a dianhydride in an organic reaction medium such as described in U.S. Pat. No. 3,856,752, the disclosure of which is incorporated by reference, to form a polyamic acid which is subsequently converted to the polyimide by known techniques, for example, by chemical and/or thermal methods. An illustrative preparation is set forth below. Polyimides useful herein can also be prepared by reacting a diisocyanate with a dianhydride such as described in U.S. Pat. No. 3,708,458, the disclosure of which is incorporated by reference.

In another preferred embodiment of the invention, the diamines that can be employed in the preparation of the polyimides useful herein include the phenylindane diamines described in U.S. Pat. No. 3,856,752, examples of which include, 5-amino-1-(4'-aminophenyl)-1,3,3-trimethylindane, 6-amino-1-(4'-aminophenyl)-1,3,3-trimethylindane, optionally substituted with alkyl, halogen or fluoroalkyl, and aromatic diamines, for example, 4,4'-methylenebis(o-chloroaniline), 3,3'-dichlorobenzidine, 3,3'-sulfonyldianiline, 4,4'-diaminobenzophenone, 1,5-diaminonaphthalene, bis(4-aminophenyl)diethyl silane, bis(4-aminophenyl)diphenyl silane, bis(4-aminophenyl)ethyl phosphine oxide, N-(bis(4-aminophenyl))N-methyl amine, N-(bis(4-aminophenyl))N-phenyl amine, 4,4'-methylenebis(2-methylaniline), 4,4'-methylenebis(2-methoxyaniline), 5,5'-methylenebis(2-aminophenol), 4,4'-methylenebis(2-methylaniline), 4,4'-oxybis(2-methoxyaniline), 4,4'-oxybis(2-chloroaniline), 2,2'-bis(4-aminophenol), 5,5'-oxybis(2-aminophenol), 4,4'-thiobis-(2-methylaniline), 4,4'-thiobis(2-methoxyaniline), 4,4'-thiobis(2-chloroaniline), 4,4'-sulfonylbis(2-methylaniline), 4,4'-sulfonylbis(2-ethoxyaniline), 4,4'-sulfonylbis(2-chloroaniline), 5,5'-sulfonylbis(2-aminophenol), 3,3'dimethyl-4,4'-diaminobenzophenone, 3,3'-dimethoxy-4,4'-diaminobenzophenone, 3,3'-dichloro-4,4'-diaminobenzophenone, 4,4'-diaminobiphenyl, m-phenylenediamine, p-phenylenediamine, 4,4'-methylenedianiline, 4,4'-oxydianiline, 4,4'-thiodianiline, 4,4'-sulfonyldianiline, 4,4'-isopropylidenedianiline, 3,3'-dimethylbenzidine, 3,3'-dimethoxybenzidine, 3,3'-dicarboxybenzidine, and diaminotoluene. In still another preferred embodiment, the phenylindane diamine is 5-amino-1-(4'-aminophenyl)-1,3,3-trimethylindane, 6-amino-1-(4'-aminophenyl)-1,3,3-trimethylindane, or mixtures thereof.

Dianhydrides that can be employed in the preparation of the polyimides useful herein include the dianhydrides described in U.S. Pat. No. 3,856,752, examples of which include phenylindane dianhydrides, such as 1-(3',4'-dicarboxyphenyl)-1,3,3-trimethylindane-5,6-dicarboxylic acid dianhydride, 1-(3',4'-dicarboxyphenyl)-1,3,3-trimethylindane-6,7-dicarboxylic acid dianhydride, 1-(3',4'-dicarboxyphenyl)-3-methylindane-5,6-dicarboxylic acid dianhydride, 1-(3',4'-dicarboxyphenyl)-3-methylindane-6,7-dicarboxylic acid dianhydride, and other dianhydrides, preferably aromatic dianhydrides or tetracarboxylic acid dianhydrides, such as 2,3,9,10-perylene tetracarboxylic acid dianhydride, 1,4,5,8-naphthalene tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, 2,3,3',4'-benzophenonetetracarboxylic acid dianhydride, pyromellitic dianhydride, 3,3',4,4'-benzophenonetetracarboxylic acid dianhydride, 2,2',3,3'-benzophenonetetracarboxylic acid dianhydride, 3,3',4,4'-biphenyltetracarboxylic acid dianhydride, 2,2',3,3'-biphenyltetracarboxylic acid dianhydride, 4,4'-isopropylidenediphthalic anhydride, 3,3'-isopropylidenediphthalic anhydride, 4,4'-oxydiphthalic anhydride, 4,4'-sulfonyldiphthalic anhydride, 3,3'-oxydiphthalic anhydride, 4,4'-methylenediphthalic anhydride, 4,4'-thiodiphthalic anhydride, 4,4'-ethylidenediphthalic anhydride, 2,3,6,7-naphthalenetetracarboxylic acid dianhydride, 1,2,4,5-naphthalenetetracarboxylic acid dianhydride, 1,2,5,6-naphthalenetetracarboxylic acid dianhydride, benzene-1,2,3,4-tetracarboxylic acid dianhydride, pyrazine-2,3,5,6-tetracarboxylic acid dianhydride and thiophene-2,3,4,5-tetracarboxylic acid dianhydride.

The diamines and dianhydrides described above are known compounds and/or can be prepared by one skilled in the art by known procedures.

The polyimides have a glass transition temperature of greater than about 200° C., preferably greater than about 300° C. The polyimides preferably have a number average molecular weight of from about 10,000 to about 300,000, more preferably 20,000 to 100,000.

Specific examples of polyimides useful in the color filter array and process of the invention include the following polyimides E-1 to E-11:

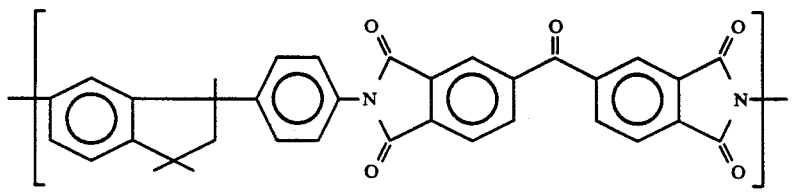

E-1
Matrimid ® 5218 (Ciba Geigy Co.)

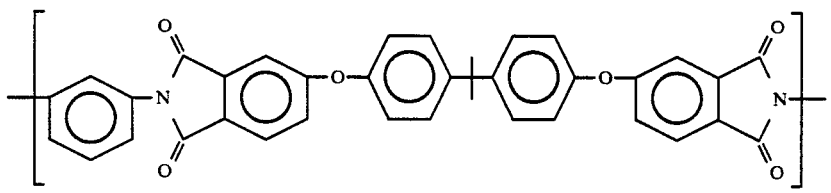

E-2
Ultem ® (General Electric Co.)

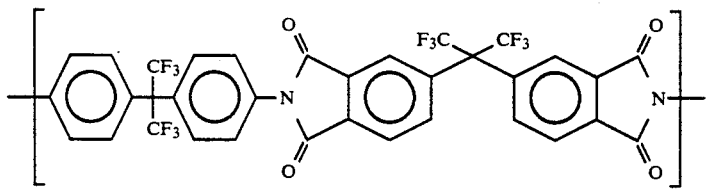

E-3
Sixef-44 ® (Hoechst Celanese Co.)

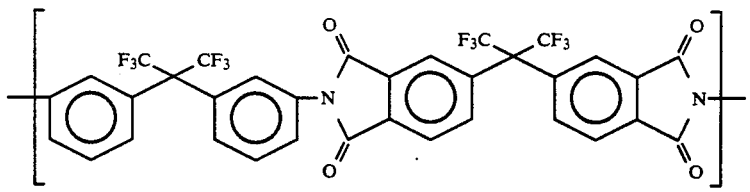

E-4
Sixef-33 ® (Hoechst Celanese Co.)

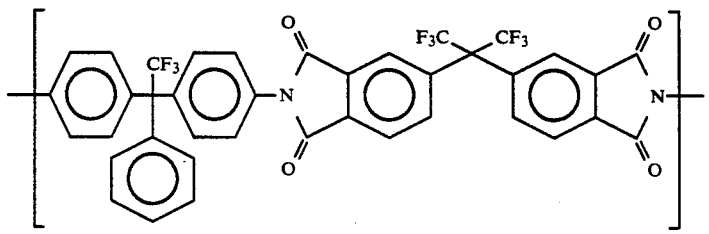

E-5

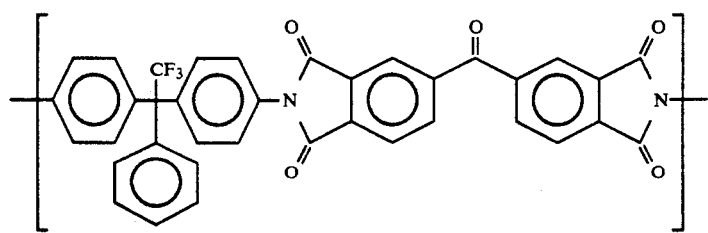

E-6

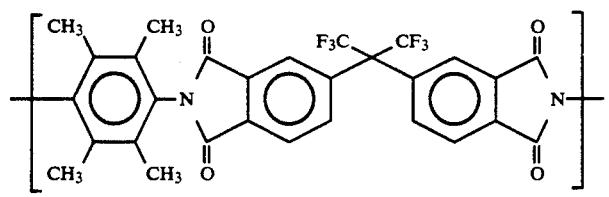

E-7

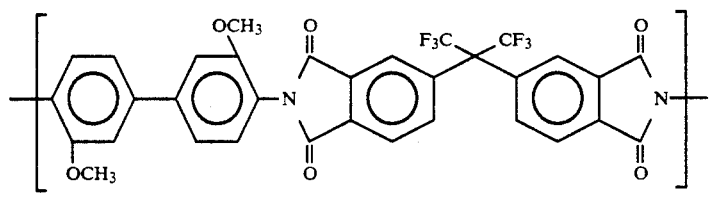

E-8

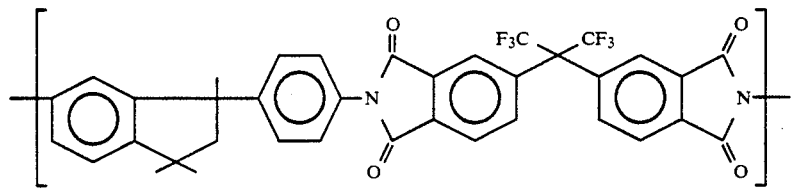

E-9

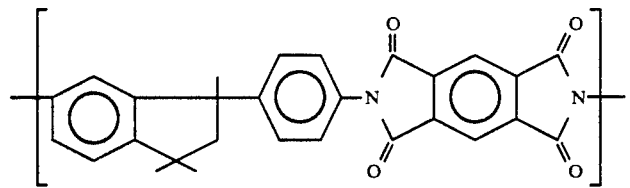

E-10

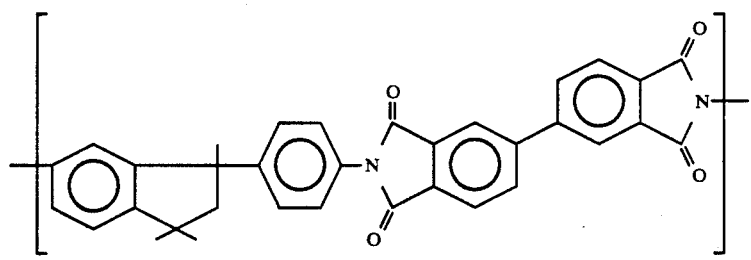

E-11

A color filter array element according to the invention comprises a repeating pattern of colorants in the polymeric dye image-receiving layer such as a mosaic pattern, preferably a set of red, green and blue additive primaries.

The size of the mosaic set is not critical since it depends on the viewing distance. In general, the individual pixels of the set are from about 50 to about 600 μm, and do not have to be of the same size.

In another preferred embodiment of the invention, the primary colors are separated from each other by an opaque area, e.g., black grid lines. This has been found to give improved color reproduction and reduce flare in the displayed image.

In a preferred embodiment of the invention, the repeating mosaic pattern of dye to form the color filter array element consists of uniform, square, linear repeating areas, with one color diagonal displacement as follows:

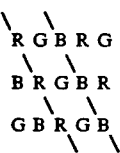

In another preferred embodiment, the above squares are approximately 100 μm.

The color filter array elements prepared according to the invention can be used in image sensors or in various electro-optical devices such as electroscopic light valves or liquid crystal display devices. Such liquid crystal display devices are described, for example, in UK Patents 2,154,355; 2,130,781; 2,162,674 and 2,161,971.

Liquid crystal display devices are commonly made by placing a material, which is liquid crystalline at the operating temperature of the device, between two transparent electrodes, usually indium tin oxide coated on a substrate such as glass, and exciting the device by applying a voltage across the electrodes. Alignment layers are provided over the transparent electrode layers on both substrates and are treated to orient the liquid crystal molecules in order to introduce a twist of, e.g., 90°, between the substrates. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not an electric field is applied.

The polymeric alignment layer described above may be any of the materials commonly used in the liquid crystal art. Such materials include polyimides, polyvinyl alcohol, methyl cellulose, etc.

The transparent conducting layer described above is also conventional in the liquid crystal art. Such materials include indium tin oxide, indium oxide, tin oxide, cadmium stannate, etc.

The dye image-receiving layer may be present at any effective level. In general, good results have been obtained at a coverage of from about 0.25 to about 5 mg/m².

The support for the color filter array element of the invention may be any transparent material such as polycarbonate, cellulose acetate, poly(ethylene terephthalate), polystyrene, etc. In a preferred embodiment, a glass support is employed such as borax glass, borosilicate glass, chromium glass, crown glass, flint glass, lime glass, potash glass, silica-flint glass, soda glass, and zinc-crown glass.

In the process of the invention, the dye image may be transferred directly from the dye-donor element to a dye image-receiving layer on a color filter array transparent support, or may first be transferred to a dye image-receiving layer on a temporary support, where the imaged layer is then subsequently transferred to a final color filter array support as disclosed in U.S. Pat. No. 4,962,081, the disclosure of which is incorporated by reference.

A dye-donor element that is used in the process of the invention comprises a support having thereon a dye layer. Any dye or mixture of dyes can be used in such a layer provided they are transferable to the dye image-receiving layer by the action of heat. Especially good results have been obtained with sublimable dyes. Examples of sublimable dyes include anthraquinone dyes, e.g., Sumikalon Violet RS ® (Sumitomo Chemical Co., Ltd.), Dianix Fast Violet 3R-FS ® (Mitsubishi Chemical Industries, Ltd.), and Kayalon Polyol Brilliant Blue N-BGM ® and KST Black 146 ® (Nippon Kayaku Co., Ltd.); azo dyes such as Kayalon Polyol Brilliant Blue BM ®, Kayalon Polyol Dark Blue 2BM ®, and KST Black KR ® (Nippon Kayaku Co., Ltd.), Sumickaron Diazo Black 5G ® (Sumitomo Chemical Co., Ltd.), and Miktazol Black 5GH ® (Mitsui Toatsu Chemicals, Inc.); direct dyes such as Direct Dark Green B ® (Mitsubishi Chemical Industries, Ltd.) and Direct Brown M ® and Direct Fast Black D ® (Nippon Kayaku Co. Ltd.); acid dyes such as Kayanol Milling Cyanine 5R ® (Nippon Kayaku Co. Ltd.); basic dyes such as Sumicacryl Blue 6G ® (Sumitomo Chemical Co., Ltd.), and Aizen Malachite Green ® (Hodogaya Chemical Co., Ltd.);

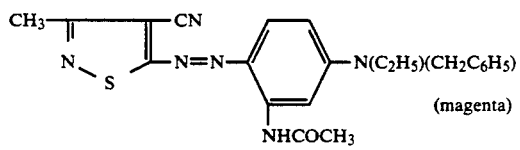
(magenta)

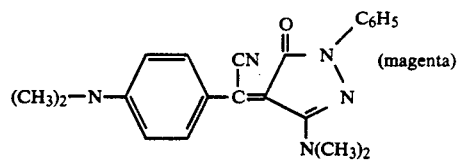
(magenta)

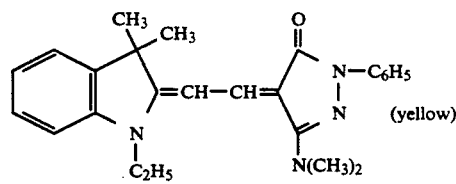
(yellow)

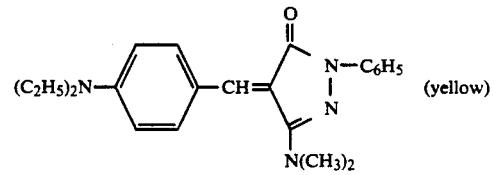
(yellow)

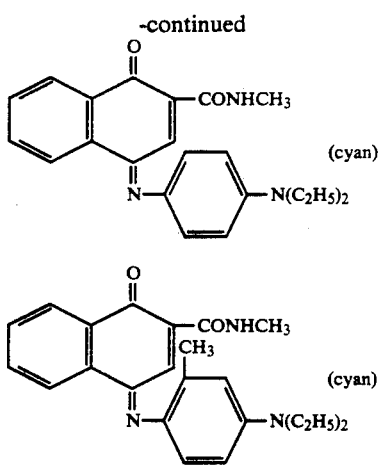

or any of the dyes disclosed in U.S. Pat. Nos. 4,541,830, 4,541,830, 4,698,651, 4,695,287; 4,701,439, 4,757,046, 4,743,582, 4,769,360 and 4,753,922, the disclosures of which are hereby incorporated by reference. The above subtractive dyes may be employed in various combinations to obtain red, blue and green additive primary colors, if desired. The dyes may be mixed within the dye layer or transferred sequentially if coated in separate dye layers. Red, green and blue additive dyes may also be used in the dye-donor for transfer to the image receiving element. The dyes may be used at a coverage of from about 0.05 to about 1 g/m$^2$.

The imaging dyes are dispersed in the dye-donor element in a polymeric binder such as a cellulose derivative, e.g., cellulose acetate hydrogen phthalate, cellulose acetate, cellulose acetate propionate, cellulose acetate butyrate, cellulose triacetate; a polycarbonate; poly(styrene-co-acrylonitrile), a poly(sulfone) or a poly(phenylene oxide). The binder may be used at a coverage of from about 0.1 to about 5 g/m$^2$.

Various methods may be used to transfer dye from the dye donor to the receiver in the process of the invention. There may be used, for example, a high intensity light flash technique with a dye-donor containing an energy absorptive material such as carbon black or a light-absorbing dye. Such a donor may be used in conjunction with a mirror which has a grid pattern formed by etching with a photoresist material. This method is described more fully in U.S. Pat. No. 4,923,860.

Another method of transferring dye from the dye donor to the receiver in the process of the invention is to use a heated embossed roller as described more fully in U.S. Pat. No. 4,978,952.

In another embodiment of the invention, the imagewise-heating is done by means of a laser using a dye-donor element comprising a support having thereon a dye layer and an absorbing material for the laser, the imagewise-heating being done in such a way as to produce a repeating mosaic pattern of colorants.

Any material that absorbs the laser energy or high intensity light flash described above may be used as the absorbing material such as carbon black or non-volatile infrared-absorbing dyes or pigments which are well known to those skilled in the art. In a preferred embodiment, cyanine infrared absorbing dyes are employed as described in U.S. Pat. No. 4,973,572, or other materials as described in the following U.S. Pat. Nos.: 4,948,777; 4,950,640; 4,950,639; 4,948,776; 4,948,778; 4,942,141; 4,952,552 and 4,912,083, the disclosures of which are hereby incorporated by reference. The laser radiation is then absorbed into the dye layer and converted to heat by a molecular process known as internal conversion. Thus, the construction of a useful dye layer will depend not only on the hue, transferability and intensity of the image dyes, but also on the ability of the dye layer to absorb the radiation and convert it to heat. The infrared-absorbing material may be contained in the dye layer itself or in a separate layer associated therewith.

After the dyes are transferred to the receiver, the color filter array image may be heated to further diffuse the dye into the dye-receiving layer in order to stabilize the image. This may be done by radiant heating or by contact with heated rollers. The fusing step aids in preventing fading and surface abrasion of the image upon exposure to light and also tends to prevent crystallization of the dyes.

The following preparation and examples further illustrate the invention.

Polyimides were prepared by addition of an equal molar amount of a dianhydride to a solution of a diamine in tetrahydrofuran (THF), N-methylpyrrolidone (NMP), dimethoxyethane, and/or N,N-dimethylacetamide (DMAc) at room temperature. The reaction was then stirred at room temperature overnight. To this solution, 3.5 molar equivalents of pyridine and 4.0 molar equivalents of acetic anhydride were added and the reaction was then stirred overnight. The solution was precipitated into methanol and the resultant fibrous polymer was chopped in a Waring blender. The polymer was then isolated by vacuum filtration, washed with methanol and dried under vacuum at 100° C. overnight. The inherent viscosity (IV) of the polyimide was determined in N,N-dimethylacetamide at 0.5 g/dL, 25° C.

E-5: This polyimide was prepared from 1,1-bis(4-aminophenyl)-1-phenyl-2,2,2-trifluoroethane (5.4779 g, 16.000 mmol) and 2,2-bis(3,4-dicarboxyphenyl)hexafluoropropane dianhydride (7.1079 g, 16.000 mmol) in THF (50 g). The polyamic acid was imidized by the addition of pyridine (4.4 g, 56 mmol) and acetic anhydride (6.5 g, 64 mmol), and the resulting polyimide was isolated to give 12 g (99%) of E-5, IV=0.44 dL/g.

E-9: This polyimide was prepared from 5-amino-1-(4'-aminophenyl)-1,3,3-trimethylindane (4.9282 g, 18.500 mmol) and 2,2-bis(3,4-dicarboxyphenyl)hexafluoropropane dianhydride (8.2186 g, 18.500 mmol) in THF (49 g). The polyamic acid was imidized by the addition of pyridine (5.1 g, 65 mmol) and acetic anhydride (7.6 g, 74 mmol), and the resulting polyimide was isolated to give 12.3 g (99%) of E-9, IV=0.68 dL/g.

E-10: This polyimide was prepared from 5-amino-1-(4'-aminophenyl)-1,3,3-trimethylindane (2.664 g, 10.00 mmol) and pyromellitic dianhydride (2.181 g, 10.00 mmol) in dimethoxyethane (24 g) and DMAc (24 g). The polyamic acid was imidized by the addition of pyridine (2.8 g, 35 mmol) and acetic anhydride (4.1 g, 40 mmol), and the resulting polyimide was isolated to give 4.38 g (98%) of E-10, IV=0.59 dL/g.

EXAMPLE

Red dye-donors were prepared by coating on a gelatin subbed transparent 175 μm poly(ethylene terephthalate) support a dye layer containing a mixture of the first magenta dye illustrated above (0.52 g/m$^2$) and the yellow dye illustrated below (0.56 g/m$^2$) in a cellulose acetate propionate (2.5% acetyl, 46% propionyl)

binder (0.54 g/m$^2$) from dichloromethane. The dye layer also contained carbon (0.54 g/m$^2$) ball-milled to submicron particle size and Fluorad FC-431 ® dispersing agent (3M Company) (0.02 g/m$^2$).

Yellow Dye:

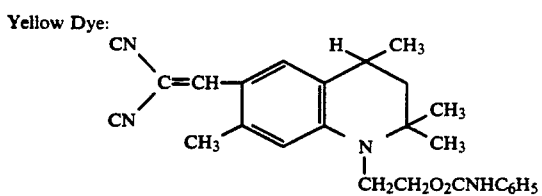

Dye receivers were prepared by spin-coating the following layers on a 1.1 mm thick flat-surfaced borosilicate glass:
1) Subbing layer of DuPont VM-651 Adhesion Promoter as a 0.1% solution in a 95:5 methanol-water solvent mixture (0.5 μm thick layer equivalent to 0.54 g/m$^2$), and
2) Receiving layer of a polyimide according to the invention (approx. 2 to 4 g/m$^2$) from an 8–10% 1,1,2-trichloroethane solution.

After coating, the receiver plate was heated for one hour at 70° C. in an oven to remove residual solvent.

The red dye-donor was placed face down upon the dye-receiver. A XFXQ-234-6 (EG&G Company) electronic flash tube was used as a thermal energy source. It was placed 32.75 mm (1.25 in) above the dye-donor using a semicylindrical parabolic reflector about 10 cm (4 inch) diameter to concentrate the energy from the flash tube to 9 joules/cm$^2$ at the donor plane. The image was defined using a mask with repeating openings 240 μm×326 μm to produce a grid pattern of rectangular dye areas separated by non-dye spacings. A vacuum and force of 0.97N were applied to hold the donor in contact with the receiver. The flash tube was flashed once at 825 volts to produce a transferred Status A density between 2.5 and 3.5.

Each transferred test sample was placed in a sealed chamber saturated with dichloromethane (DCM) vapors for 2 to 5 minutes at 14° to 16° C. DCM vapor temperature to diffuse the dyes into the receiver layer. The images were fused long enough such that the dyes were resistant to being wiped off the receiver by a methanol dampened cloth but not so long that the images smeared.

The Status A Green transmission density was read with a narrow aperture microdensitometer over a linear distance of 1100 μm for two adjacent dye areas (Dmax) and the non-dye areas separating them (Dmin or background density).

The grid pattern image on the receiver was then placed in an oven at 180° C. for one hour and the transmission densities were again read. The change in the net difference in density (Dmax-Dmin) before and after the heat treatment is an indication of the image smear. For the finely detailed image if there was no change in edge sharpness by heat treatment, there would be no change in this density difference before and after the heat treatment. In case of severe image degradation, the imaged area would smear completely into the non-imaged area and the density difference would approach zero. Lower values of the net density difference after heat treatment are thus to be avoided and are undesirable. The ratio of the after heating density difference to the initial density difference is a measure of the image degradation. Values above 0.6, more preferably above 0.7, are desirable. The following results were obtained:

| Receiver | Tg(°C.) | Status A Green Density (Dmax - Dmin) | | Initial/After Ratio |
|---|---|---|---|---|
| | | Initial | After | |
| E-1 | 320 | 2.7 | 2.3 | 0.85 |
| E-2 | 220 | 2.8 | 1.8 | 0.64 |
| E-3 | 322 | 3.0 | 2.2 | 0.73 |
| E-4 | 254 | 3.0 | 1.9 | 0.63 |
| E-5 | 335 | 2.6 | 1.9 | 0.73 |
| E-6 | 323 | 2.8 | 2.3 | 0.82 |
| E-7 | 406 | 3.3 | 2.5 | 0.76 |
| E-8 | 342 | 2.5 | 2.0 | 0.80 |
| E-9 | 338 | 2.6 | 2.0 | 0.77 |
| E-10 | 413 | 2.5 | 2.1 | 0.84 |
| E-11 | >300 | 2.8 | 2.3 | 0.82 |

The above data show that the receiver polymers of the invention are effective at accepting dye and are resistant to sever image degradation when a fine-detailed image is subjected to heat treatment.

The invention has been described in detail with particular reference to preferred embodiments thereof, but it will be understood that variations and modifications can be effected within the spirit and scope of the invention.

What is claimed is:

1. A thermally-transferred color filter array element comprising a transparent support having thereon a thermally-transferred image comprising a repeating mosaic pattern of colorants in a polyimide binder having a Tg greater than about 200° C.

2. The element of claim 1 wherein said polyimide binder has a number average molecular weight of from about 10,000 to about 300,000.

3. The element of claim 1 wherein said polyimide has the formula

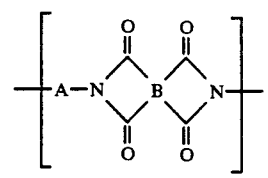

wherein A is derived from a diamine and B is derived from a dianhydride.

4. The element of claim 3 wherein each said diamine and dihydride are aromatic.

5. The element of claim 4 wherein each said aromatic diamine and aromatic dianhydride contains fluoro groups.

6. The element of claim 3 wherein said diamine is a phenylindane diamine.

7. The element of claim 6 wherein said phenylindane diamine is 5-amino-1-(4'-aminophenyl)- 1,3,3-trimethylindane, 6-amino-1-(4'-aminophenyl)-1,3,3-trimethylindane, or mixtures thereof.

8. The element of claim 1 wherein said thermally-transferred image comprises one or more sublimable dyes.

9. The element of claim 1 wherein said pattern consists of a set of red, green and blue additive primaries.

10. The element of claim 1 wherein said thermally-transferred image is laser induced.

11. The element of claim 1 wherein said thermally transferred image is obtained using a high intensity light flash.

12. The element of claim 1 wherein said support is glass.

13. A process of forming a color filter array element comprising:
 a) imagewise-heating a dye-donor element comprising a support having thereon a dye layer, and
 b) transferring portions of the dye layer to a dye-receiving element comprising a support having thereon a dye image-receiving layer, wherein the imagewise-heating and transferring produces a repeating mosaic pattern of colorants forming a color filter array, and wherein the dye image-receiving layer comprises a polyimide binder having a Tg greater than about 200° C.

14. The process of claim 13 wherein the polyimide has the formula

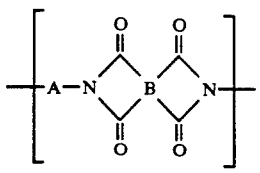

wherein A is derived from a diamine and B is derived from a dianhydride.

15. The process of claim 14 wherein each said diamine and diahydride are aromatic.

16. The process of claim 15 wherein each said aromatic diamine and aromatic dianhydride contains fluoro groups.

17. The process of claim 14 wherein said diamine is a phenylindane diamine.

18. The process of claim 13 wherein said pattern consists of a set of red, green and blue additive primaries.

19. The process of claim 13 wherein a laser is used to perform said imagewise-heating step.

20. The process of claim 13 wherein a high intensity light flash is used to perform said imagewise-heating step.

* * * * *